US012591142B2

(12) United States Patent
Huang

(10) Patent No.: US 12,591,142 B2
(45) Date of Patent: Mar. 31, 2026

(54) METHOD FOR ADJUSTING HEAD-MOUNTED DEVICE AND HEAD-MOUNTED DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Hui Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 298 days.

(21) Appl. No.: 18/371,727

(22) Filed: Sep. 22, 2023

(65) Prior Publication Data

US 2024/0012259 A1     Jan. 11, 2024

(30) Foreign Application Priority Data

Jan. 17, 2023   (CN) ......................... 202310112864.1

(51) Int. Cl.
*G02B 27/01* (2006.01)
*G02B 27/00* (2006.01)

(52) U.S. Cl.
CPC ..... *G02B 27/0176* (2013.01); *G02B 27/0093* (2013.01); *G02B 27/0172* (2013.01); *G02B 2027/0154* (2013.01)

(58) Field of Classification Search
CPC ............ G02B 27/0176; G02B 27/0093; G02B 27/017
See application file for complete search history.

(56) References Cited

FOREIGN PATENT DOCUMENTS

| CN | 106019589 A | 10/2016 |
| CN | 109725418 A | 5/2019 |
| CN | 215937324 U | 3/2022 |

OTHER PUBLICATIONS

109725418 A (Liu, Mu) machine translation (Year: 2019).*
CN 215937324 machine translation (Year: 2022).*

* cited by examiner

*Primary Examiner* — James A Dudek
(74) *Attorney, Agent, or Firm* — ScienBiziP, P.C.

(57) ABSTRACT
A method for adjusting a head-mounted device comprises: a pupil detecting phase for detecting two pupils of user; a deviation judging phase for judging whether the head-mounted device is worn with or without deviation; a display guiding phase displaying a guiding picture by a first monitor and a second monitor to guide the user to adjust the wearing of the head-mounted device; a pupillary distance detecting phase for measuring the pupillary distance of the user; and an adjusting phase for defining a first range corresponding to the pupillary distance, and adjusting the distance between the first monitor and the second monitor within the first range, so that the first monitor is aligned with one pupil, and the second monitor is aligned with the other pupil, increasing the visual range of the user, thereby improving the user's experience. A head-mounted device using the method is also disclosed.

18 Claims, 8 Drawing Sheets

100

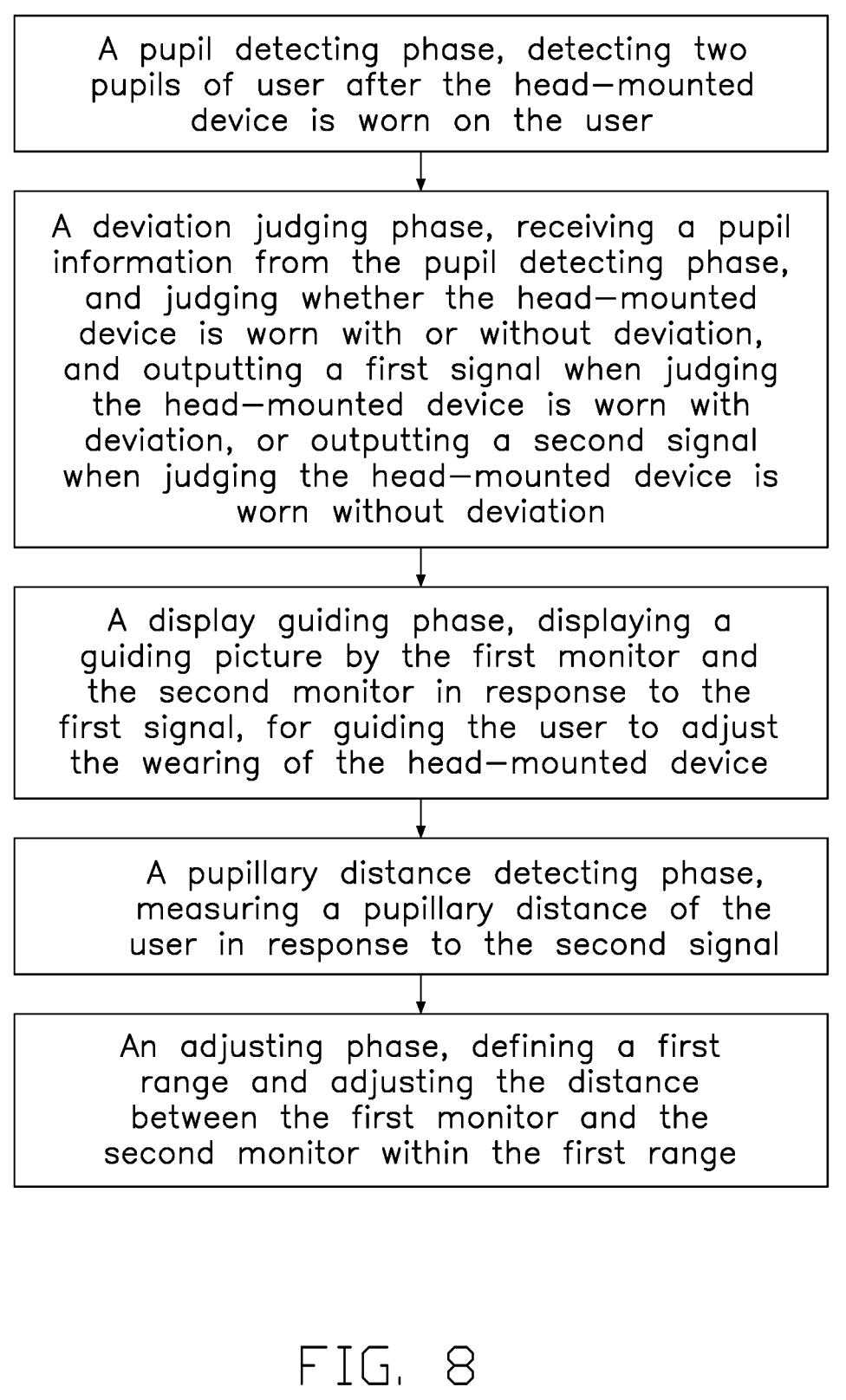

A pupil detecting phase, detecting two pupils of user after the head—mounted device is worn on the user A deviation judging phase, receiving a pupil information from the pupil detecting phase, and judging whether the head—mounted device is worn with or without deviation, and outputting a first signal when judging the head—mounted device is worn with deviation, or outputting a second signal when judging the head—mounted device is worn without deviation A display guiding phase, displaying a guiding picture by the first monitor and the second monitor in response to the first signal, for guiding the user to adjust the wearing of the head—mounted device A pupillary distance detecting phase, measuring a pupillary distance of the user in response to the second signal An adjusting phase, defining a first range and adjusting the distance between the first monitor and the second monitor within the first range

FIG. 8

METHOD FOR ADJUSTING HEAD-MOUNTED DEVICE AND HEAD-MOUNTED DEVICE

FIELD

The disclosure herein generally relates to wearable display devices, and more particularly relates to a method for adjusting a head-mounted device and a head-mounted device.

BACKGROUND

Now, head-mounted display devices such as VR (Virtual Reality) glasses and AR (Augmented Reality) glasses are becoming popular. Users have certain requirements for the user experience of using head-mounted display devices.

Usually, a head-mounted display device includes a first monitor and a second monitor corresponding to two pupils of the user. However, when the user wears the head-mounted display device, there may be a problem that the pupils deviate from the first monitor and the second monitor, which reduces the user experience.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 8 is a flowchart illustrating a method for adjusting a head-mounted device according to an embodiment of the present disclosure.

DETAILED DESCRIPTION

Figure 1:
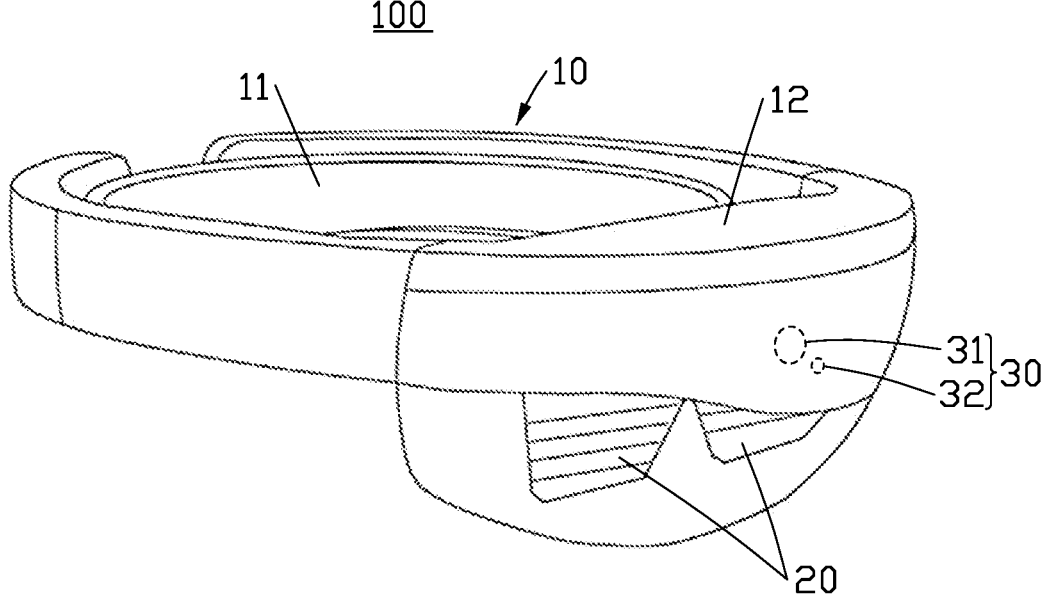
FIG. 1 is an isometric view of a head-mounted device according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "comprising" means "including, but not necessarily limited to"; it specifically indicates open-ended inclusion or membership in a so-described combination, group, series, and the like.

Without a given definition otherwise, all terms used have the same meaning as commonly understood by those skilled in the art. The terms used herein in the description of the present disclosure are for the purpose of describing specific embodiments only, and are not intended to limit the present disclosure.

Figure 2:
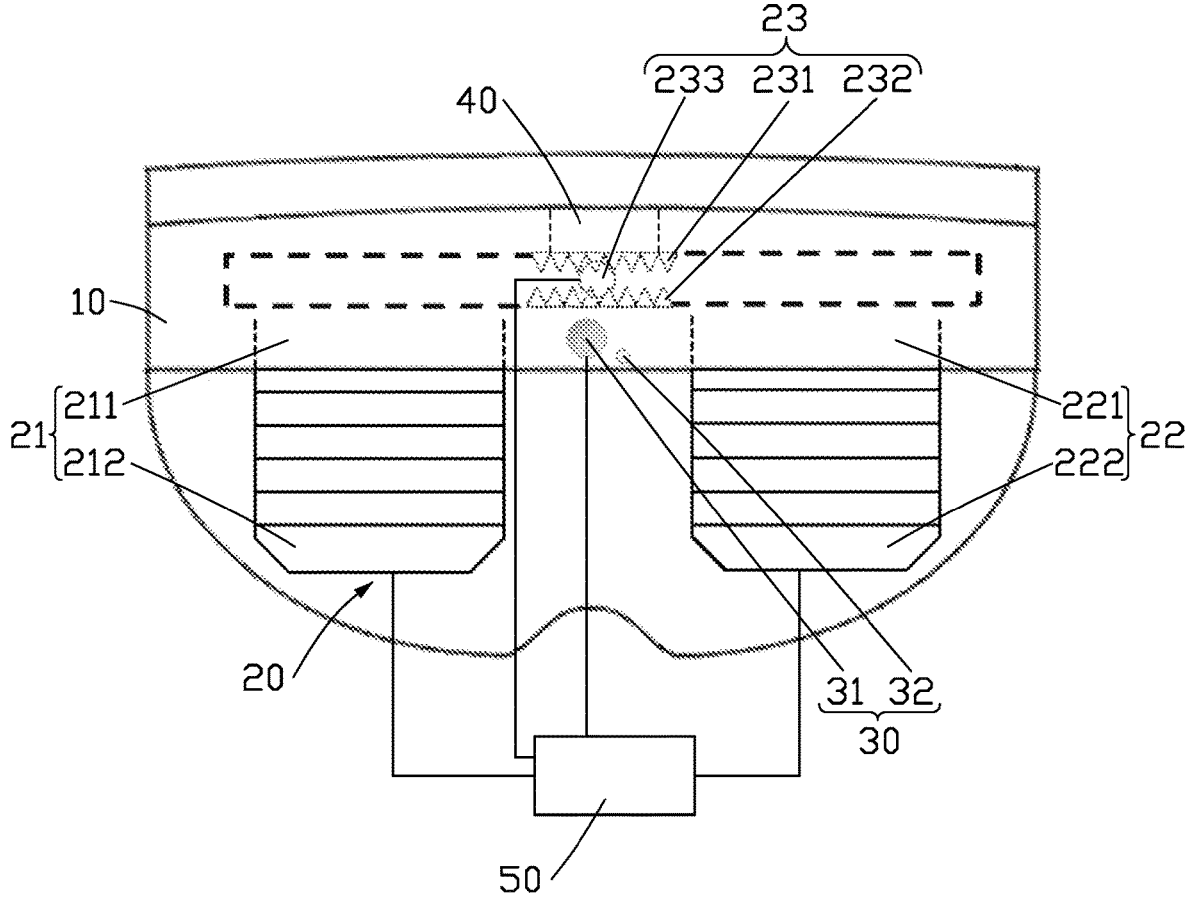
FIG. 2 is a schematic view illustrating the position of a display part, a detecting part, and an adjusting part in the head-mounted device in FIG. 1.

As shown in FIG. 1 and FIG. 2, a head-mounted device 100 in one embodiment includes a main body 10, a display part 20, a detecting part 30, an adjusting part 40, and a controller 50. The main body 10 is wearable on the head of the user. The display part 20 is installed on the main body 10 and is connected to the adjusting part 40. The detecting part 30 is configured for detecting two pupils of the user. The controller 50, the display part 20, the detecting part 30, and the adjusting part 40 are electrically connected.

In some embodiments, the head-mounted device 100 can be VR (Virtual Reality) glasses, AR (Augmented Reality) glasses, or other glasses for displaying images.

In some embodiments, as shown in FIG. 1, the main body 10 includes a first fixing part 11, and the first fixing part 11 is wearable on the head of the user. A first fixing part 11 can be wrapped around the head of the user to be to be fixed, so the main body 10 can be worn onto the user. For example, the first fixing part 11 is a headband or a strap. The first fixing part 11 can also be hung on the ear of the user, so the main body 10 can be worn on the user. For example, the first fixing part 11 has a flexible ear-hook structure, or the first fixing part 11 is an ear strap applied to items such as masks or earphones.

In some embodiments, as shown in FIG. 1, the main body 10 also includes a second fixing part 12. The second fixing part 12 is wearable on the head of the user. The second fixing part 12 cooperates with the first fixing part 11, to improve the stability of wearing of the main body 10. For example, the second fixing part 12 is supported on the bridge of the user's nose.

Figure 3:
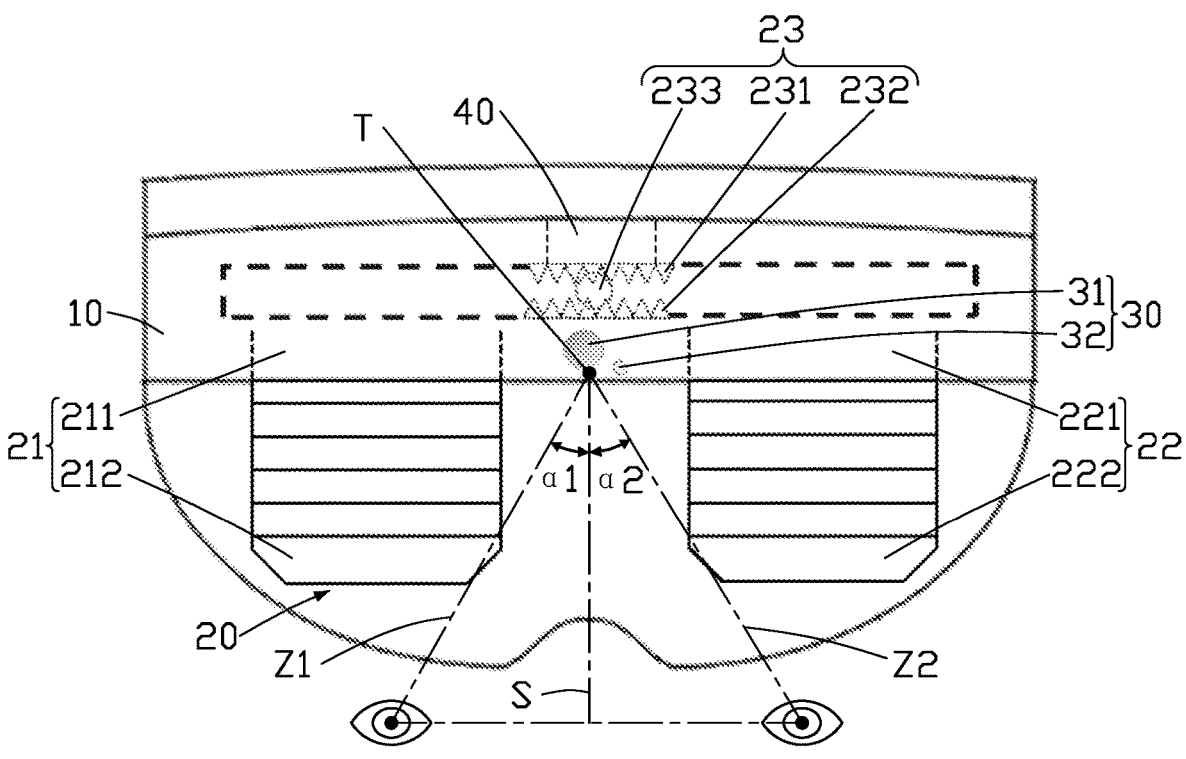
FIG. 3 is a schematic view illustrating the position of pupils of user, the display part, the detecting part, and the adjusting part in the head-mounted device of FIG. 1.

As shown in FIG. 2 and FIG. 3, the display part 20 includes a first monitor 21 and a second monitor 22. The first monitor 21 and the second monitor 22 are installed on the main body 10. The first monitor 21 and the second monitor 22 are used for displaying images, and the images can be a real picture, a virtual picture, or a combination of a real picture and a virtual picture. The first monitor 21 is corresponded to one of the two pupils of the user, and the second monitor 22 is corresponded to the other one of the two pupils of the user. The first monitor 21 and the second monitor 22 can be directly connected to the main body 10, or the first monitor 21 and the second monitor 22 can be indirectly connected with main body 10 through other components. The first monitor 21 and the second monitor 22 can move towards to each other or move away from each other.

In some embodiments, the first monitor 21 includes a first projector 211 and a first waveguide element 212. The second monitor 22 includes a second projector 221 and a second waveguide element 222. The first projector 211 and the second projector 221 are used for projection. The first projector 211 is used for projecting images on the first waveguide element 212, and the second projector 221 is used for projecting images on the second waveguide element 222. The first waveguide element 212 is corresponded to one of the two pupils of the user, and the second waveguide element 222 is corresponded to the other one of the two pupils of the user. The first waveguide element 212 and the second waveguide element 222 show the images to the user.

As shown in FIG. 2 and FIG. 3, the adjusting part 40 is connected to the first monitor 21 and the second monitor 22. The adjusting part 40 is used for moving the first monitor 21 and the second monitor 22 towards to each other or away from each other.

In some embodiments, as shown in FIG. 2 and FIG. 3, the display part 20 further includes a connecting component 23. The connecting component 23 is connected to the first monitor 21 and the second monitor 22. The connecting component 23 is also connected to the adjusting part 40. The adjusting part 40 is used for adjusting the connecting component 23, making the connecting component 23 move the first monitor 21 and the second monitor 22 towards to each other or away from each other. The connecting component 23 allows the adjusting part 40 to adjust the first monitor 21 and the second monitor 22 at the same time, which improves the speed and convenience of adjustment, and also reduces the number of adjusting parts 40, making the structure of the head-mounted device 100 more compact.

In some embodiments, as shown in FIG. 2 and FIG. 3, the adjusting part 40 is a motor. The first monitor 21 includes a first projector 211 and a first waveguide element 212. The second monitor 22 includes a second projector 221 and a second waveguide element 222. The first projector 211 is connected to the first waveguide element 212, and the second projector 221 is connected to the second waveguide element 222. The connecting component 23 includes a first rack 231, a second rack 232, and a gear 233. The first rack 231 is connected to the first projector 211. The second rack 232 is connected to the second projector 221. The first rack 231 and the second rack 232 are engaged with the gear 233. The gear 233 is connected to the motor. The motor is used for rotating the gear 233. The gear 233 is used for moving the first rack 231 and the second rack 232 back and forth, so as to move the first projector 211 and the second projector 221 towards to each other or away from each other, thereby moving the first monitor 21 and the second monitor 22 towards to each other or away from each other.

In some other embodiments, the adjusting part 40 includes two electrical push rods, one of the two push rods is connected to the first monitor 21, the other one of the two push rods is connected to the second monitor 22, the two push rods are used for pushing the first monitor 21 and the second monitor 22 move towards each other or move away from each other.

In some embodiments, as shown in FIG. 2 and FIG. 3, the detecting part 30 includes an eye tracker 31 and a distance detector 32. The eye tracker 31 and the distance detector 32 are connected to the main body 10. The eye tracker 31 is used for detecting the angle between the two pupils and the main body 10. The distance detector 32 detecting the distance between the two pupils and the main body 10. A measuring point T can be preset on the main body 10, then the angle and the distance between the measuring point T and the pupils can be detected. The measuring point T may be at the position of the eye tracker 31 or at the position of the distance detector 32. The eye tracker 31 and the distance detector 32 can detect the angle and distance between the pupils and the main body 10, which is beneficial to the pupil information and improve the accuracy of detection.

Detected by the detecting part 30, the distance between the measuring point T and one of the two pupils is defined as a first distance Z1, the distance between the preset measuring point T and the other one of the two pupils is defined as a second distance Z2. The distance(s) detected between the measuring point T and two pupils can be either or both of the first distance Z1 and the second distance Z2. The measuring point T is located on the line of symmetry S between the first monitor 21 and the second monitor 22. An angle between a line connecting the preset measuring point T and one of the two pupils and the line of symmetry S is defined as a first angle α1, and an angle between a line connecting the preset measuring point T and the other one of the two pupils and the line of symmetry S is defined as a second angle α2. The angle(s) detected between the measuring point T and the two pupils can be either or both of the first angle α1 and the second angle α2.

In some embodiments, the eye tracker 31 can be an instrument combined with a camera and a sensor. The distance detector 32 can be an ultrasonic ranging sensor, a laser ranging sensor, or an infrared ranging sensor, etc.

The controller 50 is electrically connected to the first monitor 21, the second monitor 22, the detecting part 30, and the adjusting part 40. The controller 50 is used for controlling the first monitor 21 and the second monitor 22 to display images. The controller 50 is also used for getting pupil information from the detecting part 30, and for controlling the first monitor 21 and the second monitor 22 to display a guiding picture according to the pupil information. The guiding picture is used for guiding the user to adjust the wearing of the main body 10. The controller 50 is also used for controlling the adjusting part 40 to adjust the distance between the first monitor 21 and the second monitor 22 according to the pupil information, until the first monitor 21 is aligned with one of the two pupils of the user and the second monitor 22 is aligned with the other one of the two pupils of the user, increasing the range of seeing of the first monitor 21 and second monitor 22, thereby improving the user's experience.

In some embodiments, the controller 50 can be central processing unit (CPU), Digital Signal Processor (DSP), Micro Controller Unit (MCU), Application Specific Integrated Circuit (ASIC), Field Programmable Gate Array (FPGA), any other type of Integrated Circuit (IC), state machines, or ARM-based processors, etc.

Figure 9:
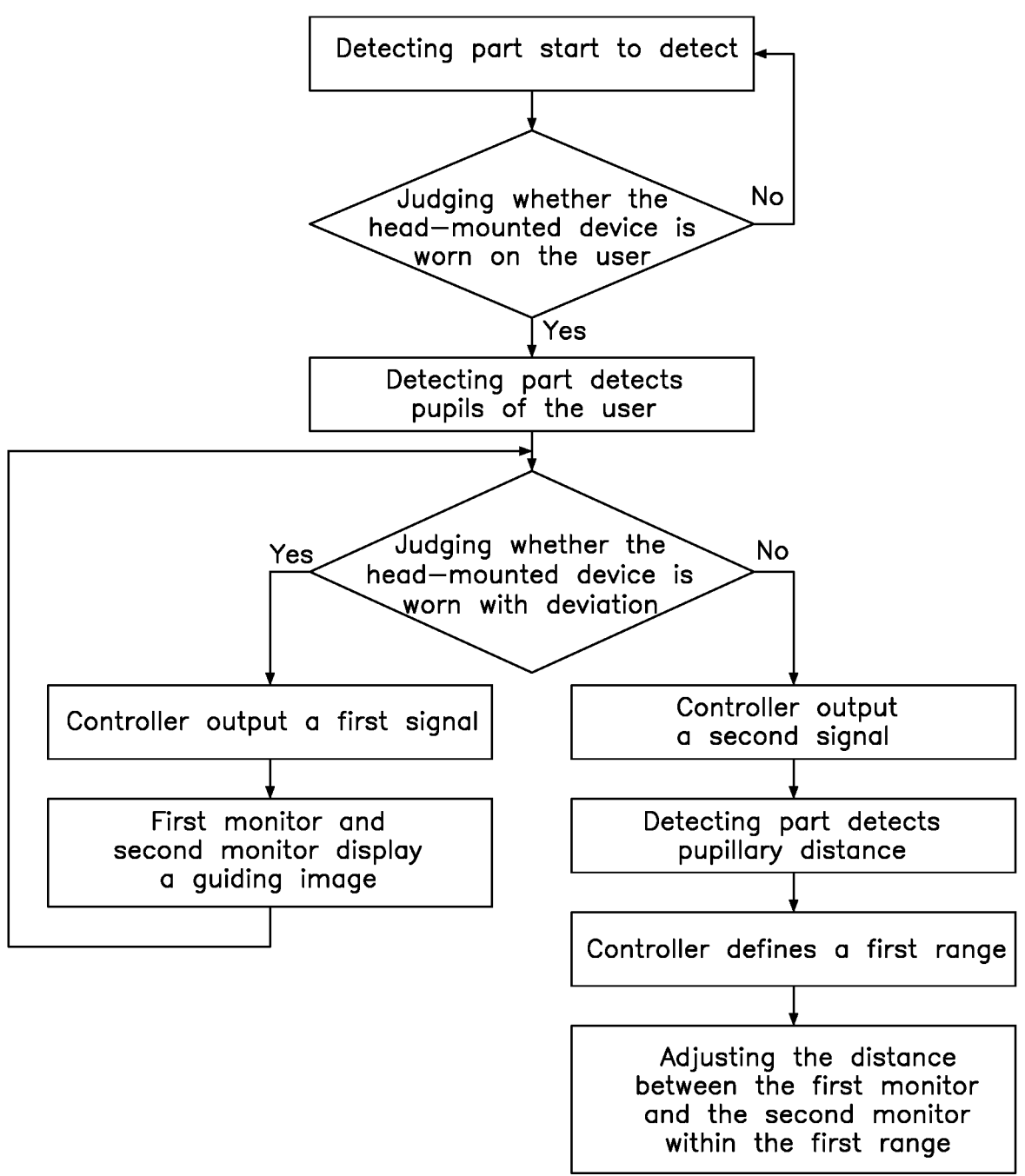
FIG. 9 is a flowchart illustrating the method for adjusting a head-mounted device in FIG. 8.

As shown in FIG. 8 and FIG. 9, a method for adjusting a head-mounted device in one embodiment is applied to the head-mounted device 100 with the first monitor 21 and the second monitor 22. For ease of understanding, the following embodiments are described in which the head-mounted device 100 includes the main body 10, the detecting part 30, the adjusting part 40 and the controller 50. It should be noted that, in some other embodiments, the objects performing the method are not limited to the main body 10, the detecting part 30, the adjusting part 40 and the controller 50.

The method for adjusting a head-mounted device includes a pupil detecting phase, a deviation judging phase, a display guiding phase, a pupillary distance detecting phase, and an adjusting phase.

The pupil detecting phase includes: the detecting part 30 detects either or both of two pupils of user after the head-mounted device 100 is worn on the user.

When the head-mounted device 100 is turned on, the detecting part 30 starts to detect. If the main body 10 is not worn on the user, the pupils of the user cannot be detected by the detecting part 30; and if the main body 10 is worn on the user, the pupils of the user can be detected by the detecting part 30.

In some embodiments, the pupil detecting phase includes:

A first step of detecting, which is the detecting part 30 measures a distance between the preset measuring point T of the head-mounted device 100 and either of the two pupils;

The preset measuring point T can be set on any one or more of the main body the first monitor 21, the second monitor 22, the detecting part 30, the adjusting part 40 and the controller 50;

In some embodiments, detected by the detecting part 30, the distance between the measuring point T and one of the two pupils is defined as a first distance Z1, the distance between the preset measuring point T and the other one of the two pupils is defined as a second distance Z2. The distance(s) detected between the measuring point T and two pupils can be either or both of the first distance Z1 and the second distance Z2;

A step of wearing judgment, which is the controller 50 comparing the distance between the preset measuring point T and either of the two pupils with a preset second range, and judging the head-mounted device 100 is not worn by the user if the distance between the preset measuring point T and either of the two pupils is outside the second range, or judging the head-mounted device 100 is worn by the user and outputting a wearing signal if the distance between the preset measuring point T and either of the two pupils is within the second range;

When the main body 10 is worn, there may be some deviation in the position of the main body 10 every time it is worn, which will cause a deviation in the distance between the measuring point T and the pupils every time, but the second range can correct the above deviation, thereby improving the detection accuracy;

The second range comprises a first distance range corresponding to the first distance and a second distance range corresponding to the second distance. In the step of wearing judgment, measuring the first distance and the second distance, and comparing the first distance with the first distance range, and comparing the second distance with the second distance range, and comparing the first distance with the second distance, so the detection accuracy can be further improved;

A second step of detection, which is the detecting part 30 measuring an angle between either of the two pupils and the preset measuring point T in response to the wearing signal, and outputting a value of angle according to the angle measured;

In some embodiments, the measuring point T is located on the line of symmetry S between the first monitor 21 and the second monitor 22. An angle between a line connecting the preset measuring point T and one of the two pupils and the line of symmetry S is defined as a first angle α1, and an angle between a line connecting the preset measuring point T and the other one of the two pupils and the line of symmetry S is defined as a second angle α2. The value of angle includes the first angle α1 and the second angle α2.

The first step of detecting and step of wearing judgment detect the distances between the pupils and the head-mounted device 100, to determine whether the user is wearing the main body 10, which reduces the number of factors to be judged and improves the speed of judgment. The second step of detection can further provide the angles between the pupils and the measuring point T, which is helpful for subsequent judgment on whether there is any deviation in the wearing of the main body 10.

The deviation judging phase includes: the controller 50 receives a pupil information detected from the pupil detecting phase, and judges whether the main body 10 is worn with or without deviation according to the pupil information, and outputs a first signal when judging the main body 10 is worn with deviation, or outputs a second signal when judging the main body 10 is worn without deviation. Specifically, the main body 10 is worn with deviation means the pupils of user are not aligned with the first monitor 21 and the second monitor 22 respectively, and the main body 10 is worn without deviation means the pupils of user are aligned with the first monitor 21 and the second monitor 22 respectively.

In some embodiments, the pupil information includes the value of angle. Because the value of angle includes the first angle α1 and the second angle α2, so that the angles between the two pupils and the measuring point T can be judged, thereby improving the detection accuracy.

In some embodiments, the deviation judging phase further includes: getting the value of angle (the first angle α1 and the second angle α2), and comparing the value of angle with a preset angle range, if the value of angle is outside the angle range, judging the main body 10 is worn with deviation and outputting a first signal, if the value of angle is within the angle range, judging the main body 10 is worn without deviation and outputting a second signal.

In some embodiments, the pupil information further includes the first distance Z1 and the second distance Z2. In the deviation judging phase, the controller 50 compares the first distance with the first distance range and compares the second distance with the second distance range. If the first distance is outside the first distance range or the second distance is outside the second distance range, the controller 50 judges the main body 10 is worn with deviation and outputting a first signal. If the first distance is within the first distance range and the second distance is within the second distance range, the controller judges the main body 10 is worn without deviation and outputting a second signal. The first distance Z1 and the second distance Z2 add conditions that affect the result, so to improve the accuracy of judgment.

Figure 4:
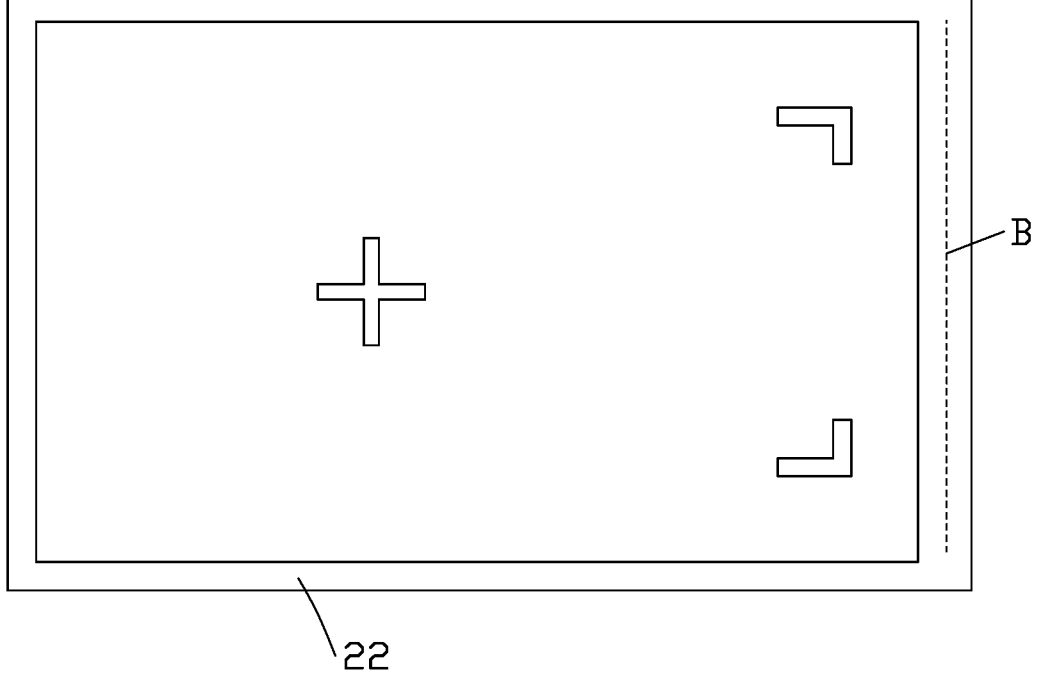
FIG. 4 is a front view of a guiding image of according to an embodiment of the present disclosure.
Figure 5:
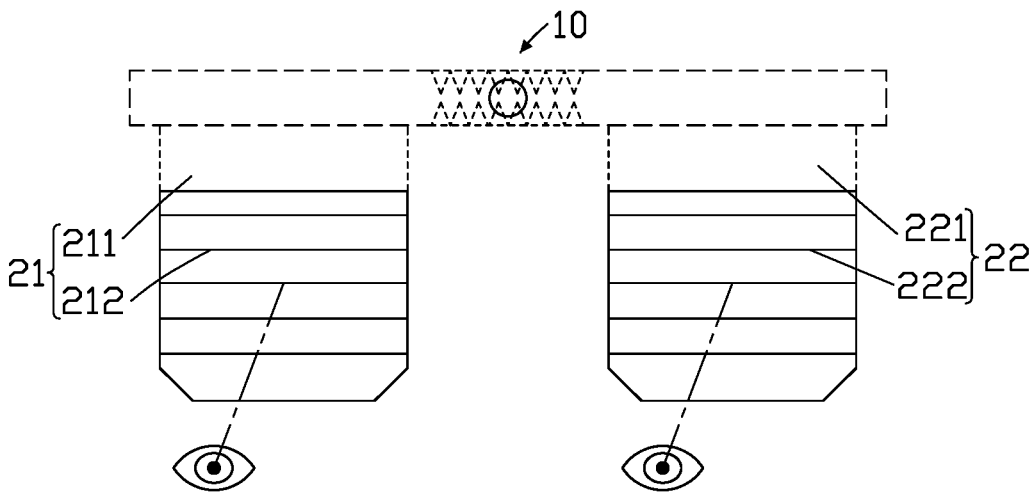
FIG. 5 is a schematic view illustrating the head-mounted device in FIG. 1 is worn with deviation.
Figure 6:
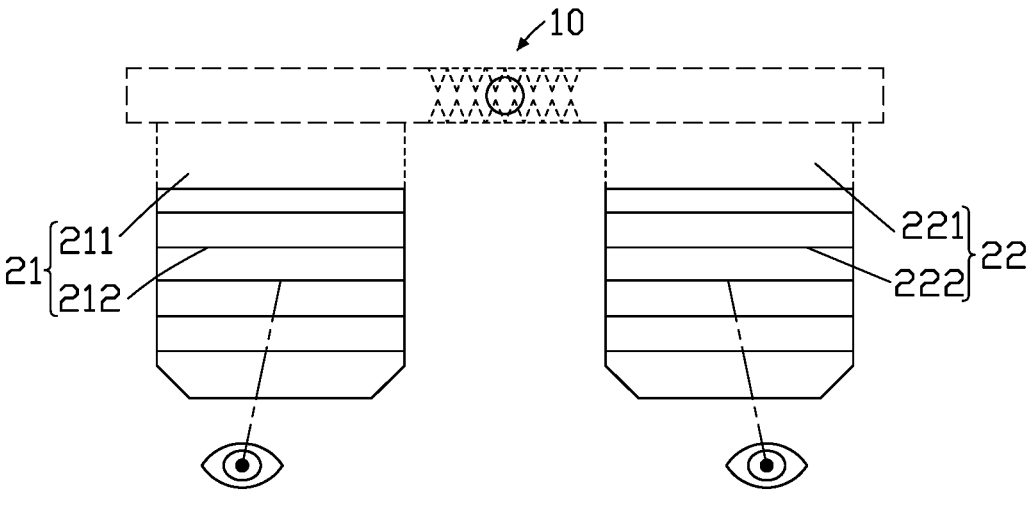
FIG. 6 is a schematic view illustrating the first monitor and the second monitor in the head-mounted device in FIG. 1 are not aligned with the pupils of user.

As shown in FIG. 4, FIG. 5, and FIG. 6, the display guiding phase includes: the first monitor 21 and the second monitor 22 display the guiding picture in response to the first signal, to guide the user to adjust the wearing position of the main body 10.

When the first monitor 21 and second monitor 22 display the guiding picture, the user can adjust the wearing position of the main body 10 according to the instructions of the guiding picture, so that the two pupils of the user are aligned with the first monitor 21 and second monitor 22, increasing the visual range of the user.

In some embodiments, when the wearing position of the main body 10 is gradually adjusted from the deviated position to the non-deviated position, the guiding picture gradually fades, and when the wearing position of the main body 10 is completely in the non-deviated position, the guiding picture disappears.

In some embodiments, as shown in FIG. 4, the guiding picture includes a virtual line B, the virtual line B is shown on the deviated side of the main body 10 from the user.

Figure 7:
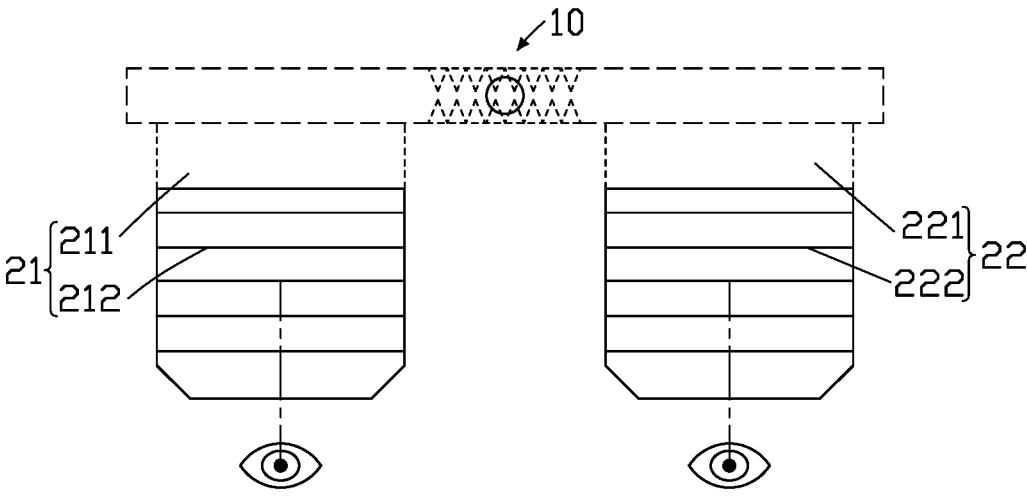
FIG. 7 is a schematic view illustrating the first monitor and the second monitor in the head-mounted device in FIG. 1 are aligned with the pupils of user.

As shown in FIG. 3 and FIG. 7, the pupillary distance detecting phase includes: the detecting part 30 measures the pupillary distance of the user when the detecting part 30 receives the second signal.

The detection part 30 can directly detect the pupillary distance or calculate the pupillary distance by detecting intermediate parameters.

In some embodiments, pupillary distance detecting phase includes:

A step of angle measurement, which is the detecting part 30 measures the first angle $\alpha 1$ and the second angle $\alpha 2$;

A step of distance measurement, which is the detecting part 30 measures the first distance Z1 and the second distance Z2;

A step of pupillary distance calculation, which is the controller 50 gathers the first angle $\alpha 1$, the second angle $\alpha 2$, the first distance Z1, and the second distance Z2, and then calculates the pupillary distance through the first angle $\alpha 1$, the second angle $\alpha 2$, the first distance Z1, and the second distance Z2.

By detecting the first angle $\alpha 1$, the second angle $\alpha 2$, the first distance Z1, and the second distance Z2, it can not only detect whether the user wears the main body 10, but also detect whether the main body 10 is worn with deviation, and also calculate the pupillary distance, reducing the quantity of the detecting part 30 and the cost, and improving the compactness of the head-mounted device 100.

In some embodiments, the eye tracker 31 is used for measuring the first angle $\alpha 1$, the second angle $\alpha 2$, the distance detector 32 is used for measuring the first distance Z1 and the second distance Z2.

The adjusting phase includes: the controller 50 defines a first range corresponding to the pupillary distance and controls the adjusting part 40 to adjust the distance between the first monitor 21 and the second monitor 22 within the first range, so to align the first monitor 21 with one of the two pupils and to align the second monitor 22 with the other one of the two pupils.

In some embodiments, the method for adjusting a head-mounted device further includes: a readjusting phase, which is the controller 50 executes sequentially the pupil detecting phase, the deviation judging phase, the display guiding phase, the pupillary distance detecting phase, and the adjusting phase in response to a readjusting signal.

In some embodiments, the head-mounted device comprises a sensor, and the sensor is used for receiving the readjusting signal to activating the readjusting phase. For example, the sensor is a button. When an exception occurs during the execution of the method, the user can press the button on the main body 10 to output the readjusting signal. In some embodiments, the user can also make a preset gesture, so that the sensor on the main body 10 senses the preset gesture to output the readjusting signal.

There are many exceptions. For example, during the execution of the method, the controller 50 generates a program error. For another example, the main body 10 is changed from a user to another user before the execution of the method is completed.

In summary, the method for adjusting a head-mounted device judges whether the main body 10 is worn with deviation by detecting the pupil, so as to guide the user to adjust the wearing of the main body 10, and the method also automatically adjusts the distance between the first monitor 21 and the second monitor 22 by detecting the user's pupillary distance, so that the first monitor 21 is aligned with one pupil, and the second monitor 22 is aligned with the other pupil, increasing the visual range of the user, thereby improving the user's experience.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A method of adjusting a head-mounted device, the head-mounted device comprising a first monitor and a second monitor, the method comprising:

detecting either or both of two pupils of a user after the head-mounted device is worn on the user, and outputting a pupil information;

receiving the pupil information, determining whether the head-mounted device is worn with or without deviation according to the pupil information, and outputting a first signal in case that the head-mounted device is determined worn with deviation, outputting a second signal in case that the head-mounted device is determined worn without deviation;

displaying a guiding picture by the first monitor and the second monitor in response to the first signal to guide the user to adjust a position of the head-mounted device; controlling the first monitor to gradually fade the guiding picture in response to the head-mounted device being adjusted from a position with deviation to a position without deviation, and controlling the first monitor to stop showing the guiding picture in response to the head-mounted device is adjusted to the position without deviation, wherein the guiding picture is controlled to display a virtual line shown on a deviated side of the head-mounted device viewed from a user side of the head-mount device;

measuring a pupillary distance of the user in response to the second signal being output; defining a first range corresponding to the measured pupillary distance, and adjusting a distance between the first monitor and the second monitor within the first range.

2. The method of claim 1, wherein detecting either or both of two pupils of a user after the head-mounted device is worn on the user comprises:

measuring a distance between a preset measuring point of the head-mounted device and either of the two pupils;

comparing the distance between the preset measuring point and the either of the two pupils with a preset second range; the method further comprising:

determining the head-mounted device is worn by the user and outputting a wearing signal in a case that the measured distance is within the preset second range, and determining the head-mounted device is not worn by the user in a case that the measured distance is outside the preset second range, wherein in the case that the wearing signal is output, the method further comprising measuring an angle between an imaginary line defined by one pupil of the two pupils and the preset measuring point and an imaginary line defined by another pupil of the two pupils and the preset measuring point, and outputting a value of the measured angle.

3. The method of claim 2, wherein a distance between the preset measuring point and one of the two pupils is defined as a first distance, a distance between the preset measuring point and another one of the two pupils is defined as a second distance, the preset second range comprises a first distance range corresponding to the first distance and a second distance range corresponding to the second distance; determining the head-mounted device is worn by the user further comprises:

measuring the first distance and the second distance, comparing the first distance with the first distance range, comparing the second distance with the second distance range, and comparing the first distance with the second distance.

4. The method of claim 2, wherein detecting either or both of two pupils of a user after the head-mounted device is worn on the user further comprising:

setting the preset measuring point is located on a line of symmetry between the first monitor and the second monitor;

measuring a first angle between the imaginary line connecting the preset measuring point and the pupils;

measuring a second angle between the imaginary line connecting the preset measuring point and the other pupils;

calculating the value of the measured angle by adding the first angle and the second angle.

5. The method of claim 2, wherein detecting either or both of two pupils of a user after the head-mounted device is worn on the user and outputting pupil information further comprises outputting the pupil information comprising the value of the measured angle.

6. The method of claim 5, wherein receiving the pupil information, determining whether the head-mounted device is worn with or without deviation according to the detected pupil information, and outputting a first signal in case that the head-mounted device is determined worn with deviation, outputting a second signal in a case that the head-mounted device is determined worn without deviation further comprises:

comparing the value of the measured angle with a preset angle range, in a case that the value of the measured angle is outside the preset angle range, determining the head-mounted device is worn with deviation and outputting the first signal, and in a case that the value of the measured angle is within the preset angle range, determining the head-mounted device is worn without deviation and outputting the second signal.

7. The method of claim 3, wherein detecting either or both of two pupils of a user after the head-mounted device is worn on the user and outputting pupil information further comprises outputting the pupil information comprising the first distance and the second distance.

8. The method of claim 7, wherein receiving the pupil information, determining whether the head-mounted device is worn with or without deviation according to the detected pupil information, and outputting a first signal in case that the head-mounted device is determined worn with deviation, outputting a second signal in a case that the head-mounted device is determined worn without deviation further comprises:

comparing the first distance with the first distance range, and comparing the second distance with the second distance range, in a case that the first distance is outside the first distance range, or in a case that the second distance is outside the second distance range, determining the head-mounted device is worn with deviation and outputting the first signal; and in a case that the first distance is within the first distance range and the second distance is within the second distance range, determining the head-mounted device is worn without deviation and outputting the second signal.

9. The method of claim 1, wherein detecting either or both of two pupils of a user after the head-mounted device is worn on the user further comprises:

setting a preset measuring point on a line of symmetry between the first monitor and the second monitor;

measuring a first angle between an imaginary line connecting the preset measuring point and one pupil of the two pupils and the line of the symmetry, and measuring a second angle between an imaginary line connecting the preset measuring point and another pupil of the two pupils and the line of the symmetry;

measuring a first distance between the preset measuring point and the pupils, and measuring a second distance between the preset measuring point and the other pupils; and calculating the pupillary distance based on the first angle, the second angle, the first distance, and the second distance.

10. The method of claim 1, further comprising:

in response to receiving a readjusting signal, repeating the method of adjusting the head-mounted devise of claim 1.

11. The method of claim 10, further comprising receiving the readjusting signal from a sensor of the head-mounted device.

12. A head-mounted device, comprising:

a main body, wearable by a user;

a display part, comprising a first monitor and a second monitor located on the main body;

a detecting part, configured for detecting two pupils of the user;

an adjusting part, connected to the first monitor and the second monitor; and a controller, connected to the first monitor, the second monitor, the detecting part, and the adjusting part, the controller causing the head-mounted device to:

detect either or both of two pupils of a user after the head-mounted device is worn on the user, and output a pupil information;

receive the pupil information, determine whether the head-mounted device is worn with or without deviation according to the pupil information, and output a first signal in case that the head-mounted device is determined worn with deviation, output a second signal in case that the head-mounted device is determined worn without deviation;

display a guiding picture by the first monitor and the second monitor in response to the first signal to guide the user to adjust a position of the head-mounted device; control the first monitor to gradually fade the guiding picture in response to the head-mounted device being adjusted from a position with deviation to a position without deviation, and control the first monitor to stop showing the guiding picture in response to the head-mounted device is adjusted to the position without deviation, wherein the guiding picture is controlled to display a virtual line shown on a deviated side of the head-mounted device viewed from a user side of the head-mount device;

measure a pupillary distance of the user in response to the second signal being output; define a first range corresponding to the measured pupillary distance, and adjust a distance between the first monitor and the second monitor within the first range.

13. The head-mounted device of claim 12, wherein the detecting part comprises an eye tracker and a distance detector connected to the main body, the eye tracker is configured for detecting an angle between an imaginary line defined by one pupil of the two pupils and a preset measuring point on the main body and an imaginary line defined by another pupil of the two pupils and the preset measuring point, the distance detector is configured for detecting a distance between each of the two pupils and the main body.

14. The head-mounted device of claim 12, wherein the display part comprises a connecting component, the connecting component is connected to the first monitor and the second monitor, and further connected to the adjusting part, the adjusting part is configured for adjusting the connecting component to move the first monitor and the second monitor towards each other or away from each other.

15. The head-mounted device of claim 14, wherein the connecting component comprises a first rack, a second rack, and a gear, the first rack is connected to the first monitor, the second rack is connected to the second monitor, the first rack and the second rack are engaged with the gear, the gear is connected to the adjusting part, the adjusting part is further configured for rotating the gear to drive the first rack and the second rack to move, causing the first monitor and the second monitor towards each other or away from each other.

16. The head-mounted device of claim 12, wherein the main body comprises a first fixing part and a second fixing part, the first fixing part is wearable on a head of the user, the second fixing part is connected to the first fixing part, the second fixing part is wearable to a nose of the user.

17. The head-mounted device of claim 12, wherein the first monitor comprises a first projector and a first waveguide element, the second monitor comprises a second projector and a second waveguide element, the first projector is configured for projecting images on the first waveguide element, the second projector is configured for projecting images on the second waveguide element, the first waveguide element is corresponded to one pupil of the two pupils of the user, the second waveguide element is corresponded to another pupil of the two pupils of the user.

18. The head-mounted device of claim 12, wherein the adjusting part comprises two push rods, one of the two push rods is connected to the first monitor, another one of the two push rods is connected to the second monitor, the two push rods are configured for pushing the first monitor and the second monitor move towards each other or away from each other.

\* \* \* \* \*